(12) United States Patent
Alexander et al.

(10) Patent No.: US 10,202,719 B2
(45) Date of Patent: Feb. 12, 2019

(54) LAUNDRY TREATING APPLIANCE WITH TUB HAVING A FLEXIBLE PORTION

(71) Applicant: WHIRLPOOL CORPORATION, Benton Harbor, MI (US)

(72) Inventors: Benjamin E. Alexander, Stevensville, MI (US); Prakash S. Amte, Wagholi (IN); Brent M. Burgess, Edwardsburg, MI (US); Michael K. Cluskey, Saint Joseph, MI (US); Nicholas C. Fugal, Benton Harbor, MI (US); Christopher A. Jones, Saint Joseph, MI (US); Dale Mueller, Haines City, FL (US); Michele A. Paustian, Kalamazoo, MI (US); Brenner M. Sharp, Bridgman, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 152 days.

(21) Appl. No.: 15/072,962

(22) Filed: Mar. 17, 2016

(65) Prior Publication Data

US 2017/0268147 A1    Sep. 21, 2017

(51) Int. Cl.
*B29C 45/16* (2006.01)
*D06F 37/12* (2006.01)
*D06F 37/26* (2006.01)

(52) U.S. Cl.
CPC ............ *D06F 37/263* (2013.01); *D06F 37/12* (2013.01); *D06F 37/262* (2013.01); *D06F 37/268* (2013.01); *B29C 45/1676* (2013.01)

(58) Field of Classification Search
CPC .................... D06F 37/26–37/269; D06F 39/12
See application file for complete search history.

(56) References Cited

U.S. PATENT DOCUMENTS

| | | | |
|---|---|---|---|
| 3,026,700 A | 3/1962 | Bochan et al. | |
| 3,026,701 A | 3/1962 | Houser | |
| 3,318,117 A | 5/1967 | Padial | |
| 3,771,335 A | 11/1973 | Hall | |
| 5,946,947 A | 9/1999 | Lee et al. | |
| 6,807,700 B2 * | 10/2004 | Panther | D06F 37/26 68/213 |
| 7,398,663 B2 | 7/2008 | Jo | |
| 2011/0277514 A1 * | 11/2011 | Kim | D06F 37/12 68/23.2 |
| 2012/0007481 A1 | 1/2012 | Filippetti et al. | |

FOREIGN PATENT DOCUMENTS

| | | |
|---|---|---|
| EP | 0808933 A2 | 11/1997 |
| EP | 2392718 A1 | 12/2011 |
| GB | 935336 A | 8/1963 |
| KR | 100765203 B1 | 10/2007 |
| KR | 100872854 B1 | 12/2008 |
| TR | 200908127 T1 | 4/2010 |
| WO | 2009004045 A1 | 1/2009 |

* cited by examiner

*Primary Examiner* — Spencer E Bell (57) ABSTRACT

A vertical axis laundry treating appliance including a chassis defining a chassis interior, a tub disposed within the chassis interior and defining a tub interior, and a perforated wash basket disposed for rotation within the tub interior, wherein the tub includes a lower tub portion, an upper tub portion, and a flexible intermediate portion.

11 Claims, 6 Drawing Sheets

LAUNDRY TREATING APPLIANCE WITH TUB HAVING A FLEXIBLE PORTION

BACKGROUND OF THE INVENTION

Laundry treating appliances, such as a washing machine, are known to have a configuration where a rotating basket is provided within a tub and the basket defines a treating chamber in which laundry is placed for treatment. The laundry treating appliance may have a controller that implements a number of user-selectable, pre-programmed cycles of operation. Hot water, cold water, or a mixture thereof along with various treating chemistries is supplied to the treating chamber in accordance with a cycle of operation. A common consideration in design of such laundry treating appliances is increasing capacity; however, a variety of factors must be considered in doing so, including, for example, increased forces that can be transferred or transmitted to the cabinet, resulting in vibration.

SUMMARY OF THE INVENTION

In another aspect, illustrative embodiments in accordance with the present disclosure relate to a vertical axis laundry treating appliance comprising a chassis defining a chassis interior, a tub disposed within the chassis interior and defining a tub interior, and a perforated wash basket disposed for rotation within the tub interior, wherein the tub comprises a lower tub portion, an upper tub portion, and a flexible intermediate portion sealingly connecting the lower tub portion to the upper tub portion.

DESCRIPTION OF EMBODIMENTS OF THE INVENTION

Typically the tub provides both liquid containment and structural functions. Both functions of the tub tend to limit the capacity of the laundry treating appliance. Embodiments in accordance with the present disclosure relate to the use of a flexible tub portion, which enables increased tub capacity while providing vibration isolation. This structure allows for many benefits, including reduced noise and less vibration transmitted to the housing, as well as the ability to have an increased capacity in the tub.

Figure 1:
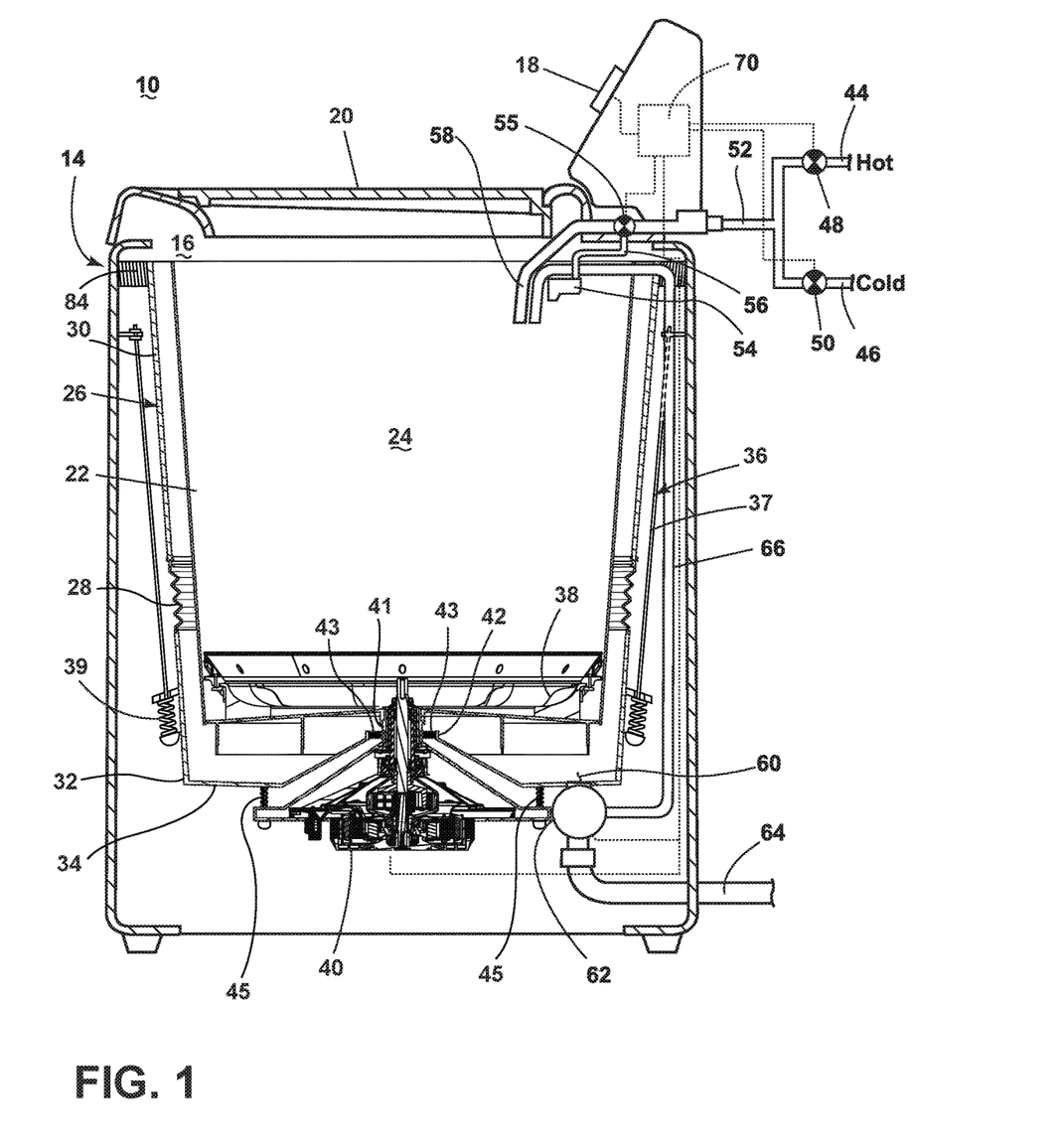
FIG. 1 is a partially schematic cross-sectional view of a laundry treating appliance according to an illustrative embodiment in accordance with the present disclosure.

FIG. 1 illustrates a laundry treating appliance in the form of a washing machine 10 according to an illustrative embodiment in accordance with the present disclosure. The laundry treating appliance is any machine that treats articles such as clothing or fabrics in a rotating treatment chamber. Non-limiting examples of the laundry treating appliance may include a vertical washing machine; a combination washing machine and dryer; and a refreshing/revitalizing machine. The washing machine 10 described herein shares many features of a traditional automatic washing machine, which will not be described in detail except as necessary for a complete understanding of illustrative embodiments in accordance with the present disclosure.

Washing machines are typically categorized as either a vertical axis washing machine or a drum type washing machine such as a horizontal axis washing machine. As used herein, a "vertical axis" washing machine refers to a washing machine having a perforate or imperforate wash basket that holds fabric items, and a mover, such as an agitator, impeller, nutator, or the like within the wash basket that moves the fabric items. The mover moves within the wash basket to impart mechanical energy directly to the clothes or indirectly through wash liquid in the wash basket. The mover may typically be moved in a reciprocating or a rotational movement, or a combination thereof. In some vertical axis washing machines, the wash basket rotates about a vertical axis generally perpendicular to a surface that supports the washing machine. However, the rotational axis need not be vertical. The wash basket may rotate about an axis inclined relative to the vertical axis. As used herein, the "drum type" washing machine refers to a washing machine having a rotatable wash basket, perforated or imperforate that holds fabric items but lacks a separate mover. The wash basket may have vanes or the like, but mechanical energy is imparted directly to the clothes or indirectly through wash liquid solely by rotation of the wash basket. In some horizontal axis washing machines, the wash basket rotates about a horizontal axis generally parallel to a surface that supports the washing machine. However, the rotational axis need not be horizontal. The wash basket may rotate about an axis inclined relative to the horizontal axis. In horizontal axis washing machines, the clothes are lifted by the rotating wash basket and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles. The illustrated exemplary washing machine of FIG. 1 is a vertical axis washing machine.

As illustrated in FIG. 1, the washing machine 10 may include a housing 14 defining an interior 16. The housing 14 can be a cabinet, a chassis, or a frame to which decorative panels may or may not be mounted. A user interface 18 is included on the housing 14 and may have one or more knobs, switches, displays, and the like for communicating with the user, such as to receive input and provide output. A door or lid 20 is operably coupled with the housing 14 and is selectively moveable between opened and closed positions to close an opening in a top wall of the housing 14, which provides access to the interior 16 of the housing 14.

A rotatable wash basket 22 having an open top is disposed within the interior of the housing 14 and may define a treating chamber 24 for treating laundry. An imperforate tub 26 may also be positioned within the interior 16 of the housing 14 and may define an interior within which the wash basket 22 is positioned. The wash basket 22 may include a plurality of perforations (not shown), such that liquid may flow between the tub 26 and the wash basket 22 through the perforations. While the illustrated washing machine 10 includes both the tub 26 and the wash basket 22, with the wash basket 22 defining the laundry treatment chamber 24, it is within the scope of the present disclosure for the laundry treating appliance to include only one receptacle, with the receptacle defining the laundry treatment chamber for receiving the load to be treated and the tub. The imperforate tub 26 is illustrated as including an upper tub portion 30, a lower tub portion 32, and a flexible intermediate portion 28.

The upper tub portion 30 is adapted to mount to the housing 14 of the washing machine 10. The mounting may be a fixation where the upper tub portion 30 is rigidly fixed to the housing 14, or the mounting may be non-fixed where some limited relative motion is permitted between the upper tub portion 30 and the housing 14, or chassis. For example, the upper tub portion 30 may be frictionally mounted to the housing where some motion is allowed in one or more directions. Non-limiting examples of motion allowed by the upper tub portion 30 relative to the housing 14 include vertical sliding movement and torsional movement of the upper tub portion 30. In exemplary implementations, the upper tub portion 30 forms a press fit with the housing 14 such that the upper tub portion 30 presses up against the interior surface of the housing 14, exerting a force that helps to hold the upper tub portion 30 in place relative to the housing 14 but still permitting limited movement of the upper tub portion 30. Furthermore, while the upper tub portion 30 is illustrated herein as being in direct contact with the housing 14, it is also contemplated that the upper tub portion 30 could be indirectly mounted to the housing 14, as for example where a friction pad 84 or the like is disposed between the upper tub portion 30 and the housing 14. When the upper tub portion 30 is mounted indirectly to the housing 14, the upper tub portion 30 can be supported entirely by the flexible intermediate portion 28 and the lower tub portion 32, with no other physical contact with the cabinet 14. It is also contemplated that the upper tub portion 30 can be provided with the friction pad 84 to provide movement buffering and/or sound absorbing functions, but the friction pad 84, or other suitable damping or absorbing material, would not provide structural support to the upper tub portion 30 when the upper tub portion 30 is not in movement. The engagement of the upper tub portion 30 with the housing 14 can be any interface that restricts or prevents rotation of the upper tub portion 30 with respect to the housing 14 while allowing vertical translation. The engagement can include, alone or in combination, any suitable additional structural features for controlling the fit between the upper tub portion 30 and the housing 14. For example, any of the intervening material, an interior surface of the housing 14 and the upper tub portion 30 can be formed with a set of vertical ribs.

While the upper tub portion 30 is illustrated as being substantially quadrilateral in shape at its upper end, it is also contemplated that the upper tub portion 30 could have any suitable shape or profile, including a cone shape. In such a case, it is contemplated that the upper tub portion 30 expands outwardly toward the housing 14 from the lower end to the upper end of the upper tub portion 30, such that the opening of the upper tub portion 30 may be nominally larger or nominally smaller than the opening in the housing 14 through which laundry to be treated is inserted through the lid 20 of the washing machine 10. Furthermore, the uppermost edge of the upper tub portion 30 can extend to the boundary of the cabinet 14 or can have some amount of clearance between the upper tub portion 30 and the cabinet 14. The lower tub portion 32 has a longitudinal axis with a bottom end being closed by a base 34. Whereas movement of the upper tub portion 30 can be constrained by its position relative to the housing 14, the lower tub portion 32 is not so constrained due to the flexible intermediate portion 28.

In illustrative embodiments, the upper tub portion 30 can have a similar shape and structure as the upper portion of the wash tub disclosed in U.S. patent application Ser. No. 14/849,958, now U.S. Pat. No. 9,909,247, issued Mar. 6, 2018, entitled LAUNDRY TREATING APPLIANCE WITH AN OVERSIZED WASH TUB, the content of which is incorporated herein by reference its entirety. By way of example, the upper tub portion 30 can have a horizontal cross-section of a rectangle with outwardly rounded portions at the corners (in contrast to the inwardly rounded portions depicted in FIG. 4, and to be described in more detail below).

A suspension system 36 is provided within the interior 16 and includes damping elements 39. In this manner, the tub 26 is also supported, in part, by the suspension system 36. More specifically, the suspension system 36 provides a suspension mounting of the lower tub portion 32 to the housing 14, or chassis. The suspension system 36 tends to dampen any vibrations generated during the rotational movement of the rotatable wash basket 22 and imparted to the lower tub portion 32. The suspension system 36 is illustrated as including a plurality of suspension rods 37 and a plurality of damping elements 39, which may include any suitable springs, damping mechanisms, etc.

A mover 38 can be located in the wash basket 22 to impart mechanical agitation to a load of laundry placed in the wash basket 22. The wash basket 22 and the mover 38 are driven by a driver or drive mechanism that includes an electrical motor 40 operably coupled with the wash basket 22 and mover 38. The base 34 of the lower tub portion 32 has an aperture 42 that surrounds the longitudinal axis of the lower tub portion 32 and is adapted to receive the driver or drive mechanism for the wash basket 22. The base 34 of the lower tub portion 32 is provided with a plurality of vertical suspension elements 45 and a plurality of horizontal suspension elements 43 that are positioned between the driver or drive mechanism and the lower tub portion 32. A clutch assembly 41 is included in the driver or drive mechanism and is provided to selectively operably couple the motor 40 with either the wash basket 22 and/or the mover 38. The mover 38 is reciprocated, oscillated or rotated about its axis of rotation during a cycle of operation in order to produce high water turbulence effective to wash the load contained within the treating chamber 24. The motor 40 may rotate or oscillate the wash basket 22 at various speeds in either rotational direction about an axis of rotation.

A liquid supply system is provided to supply liquid, such as water or a combination of water and one or more wash aids, such as detergent, into the treating chamber 24. The liquid supply system may include a water supply configured to supply hot or cold water. The water supply may include a hot water inlet 44 and a cold water inlet 46, a valve assembly, which may include a hot water valve 48, a cold water valve 50, and a diverter valve 55, and various conduits 52, 56, 58. The valves 48, 50 are selectively openable to provide water, such as from a household water supply (not shown) to the conduit 52. The valves 48 and 50 can be opened individually or together to provide a mix of hot and cold water at a selected temperature. While the valves 48, 50 and conduit 52 are illustrated exteriorly of the housing 14, it is understood that these components can be internal to the housing 14.

As illustrated, a detergent dispenser 54 is fluidly coupled with the conduit 52 through a diverter valve 55 and a first water conduit 56. The detergent dispenser 54 may include means for supplying or mixing detergent to or with water from the first water conduit 56 and may supply such treating liquid to the tub 26. It has been contemplated that water from the first water conduit 56 may also be supplied to the tub 26 through the detergent dispenser 54 without the addition of a detergent. A second water conduit 58, illustrated as a separate water inlet, may also be fluidly coupled with the conduit 52 through the diverter valve 55 such that water is supplied directly to the treating chamber through the open top of the wash basket 22. Additionally, the liquid supply system may differ from the configuration shown, such as by inclusion of other valves, conduits, wash aid dispensers, heaters, sensors, such as liquid level sensors and temperature sensors, and the like, to control the flow of treating liquid through the washing machine 10 and for the introduction of more than one type of detergent/wash aid.

A liquid recirculation system is provided for recirculating liquid from the tub 26 into the treating chamber 24. More specifically, a sump 60 is located in the bottom of the tub 26 and the liquid recirculation system is configured to recirculate treating liquid from the sump 60 onto the top of a laundry load located in the treating chamber 24. A pump 62 is housed below the tub 26 and may have an inlet fluidly coupled with the sump 60 and an outlet configured to fluidly couple to either or both a household drain 64 or a recirculation conduit 66. In this configuration, the pump 62 is used to drain or recirculate wash liquid in the sump 60. As illustrated, the recirculation conduit 66 is fluidly coupled with the treating chamber 24 such that it supplies liquid into the open top of the wash basket 22. The liquid recirculation system may include other types of recirculation systems.

Figure 2:
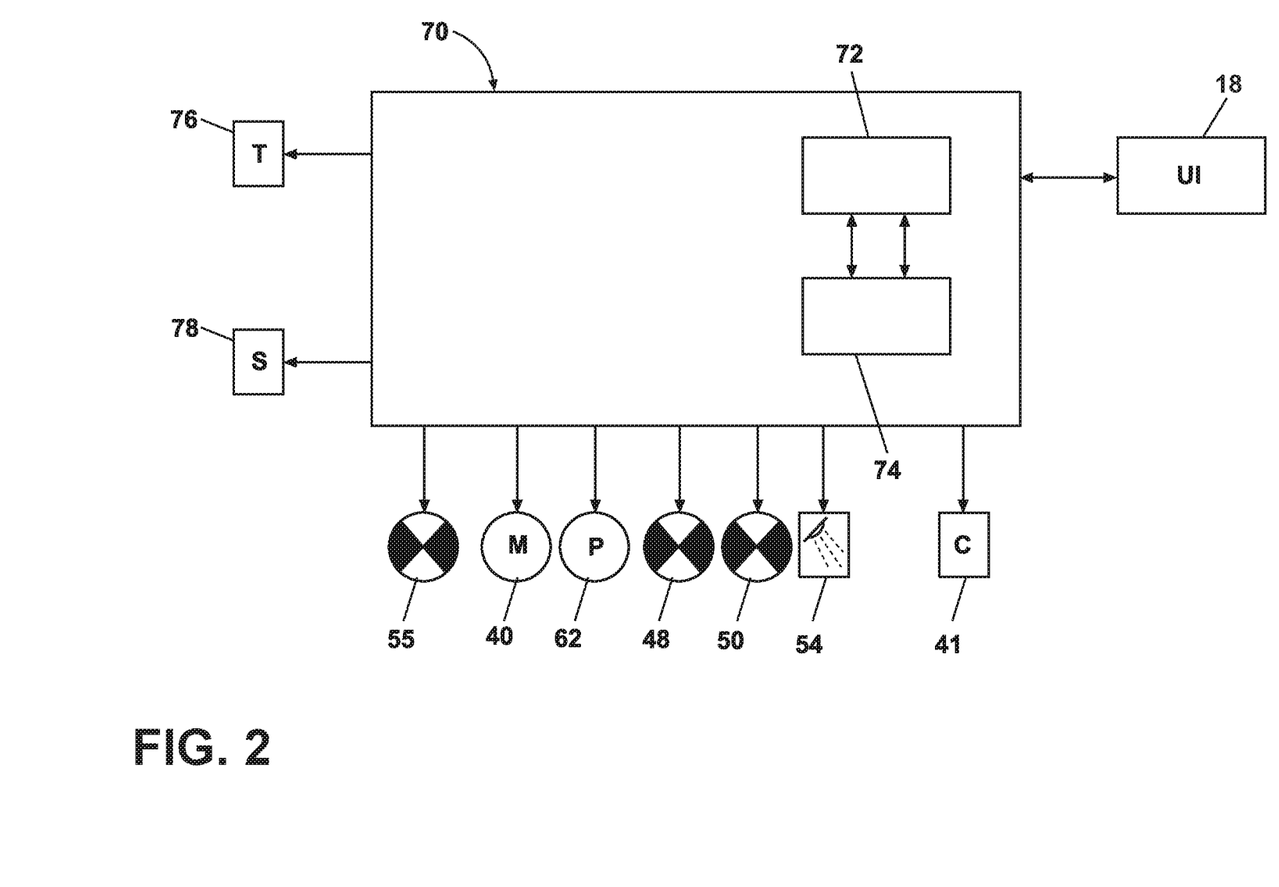
FIG. 2 is a schematic representation of a controller for controlling the operation of one or more components of the laundry treating appliance of FIG. 1.

The washing machine 10 may further include a controller 70 coupled with various working components of the washing machine 10 to control the operation of the working components. As illustrated in FIG. 2, the controller 70 is provided with a memory 72 and a central processing unit (CPU) 74. The memory 72 is used for storing the control software that is executed by the CPU 74 in completing a cycle of operation using the washing machine 10 and any additional software. The memory 72 may also be used to store information, such as a database or table, and to store data received from the one or more components of the washing machine 10 that is communicably coupled with the controller 70.

The controller 70 is operably coupled with one or more components of the washing machine 10 for communicating with and/or controlling the operation of the components to complete a cycle of operation. For example, the controller 70 is coupled with the hot water valve 48, the cold water valve 50, diverter valve 55, and the detergent dispenser 54 for controlling the temperature and flow rate of treating liquid into the treating chamber 24; the pump 62 for controlling the amount of treating liquid in the treating chamber 24 or sump 60; the motor 40 and clutch assembly 41 for controlling the direction and speed of rotation of the wash basket 22 and/or the clothes mover 38; and the user interface 18 for receiving user selected inputs and communicating information to the user. The controller 70 may also receive input from a temperature sensor 76, such as a thermistor, which may detect the temperature of the treating liquid in the treating chamber 24 and/or the temperature of the treating liquid being supplied to the treating chamber 24. The controller 70 may also receive input from various additional sensors 78, which are known in the art and not shown for simplicity. Non-limiting examples of additional sensors 78 that is communicably coupled with the controller 70 include: a weight sensor, and a motor torque sensor.

The washing machine 10 can perform one or more manual or automatic treating cycles or cycle of operation. A common cycle of operation includes a wash phase, a rinse phase, and a spin extraction phase. Other phases for cycles of operation include, but are not limited to, intermediate extraction phases, such as between the wash and rinse phases, and a pre-wash phase preceding the wash phase, and some cycles of operation include only a select one or more of these exemplary phases. During operation, because the motion of the wash basket 22 is decoupled from the upper tub portion 30 that is mounted to the housing 14, due to the presence of the flexible intermediate portion 28 of the tub 26, the vibration that is transmitted is reduced and less noise is created.

Figure 3:
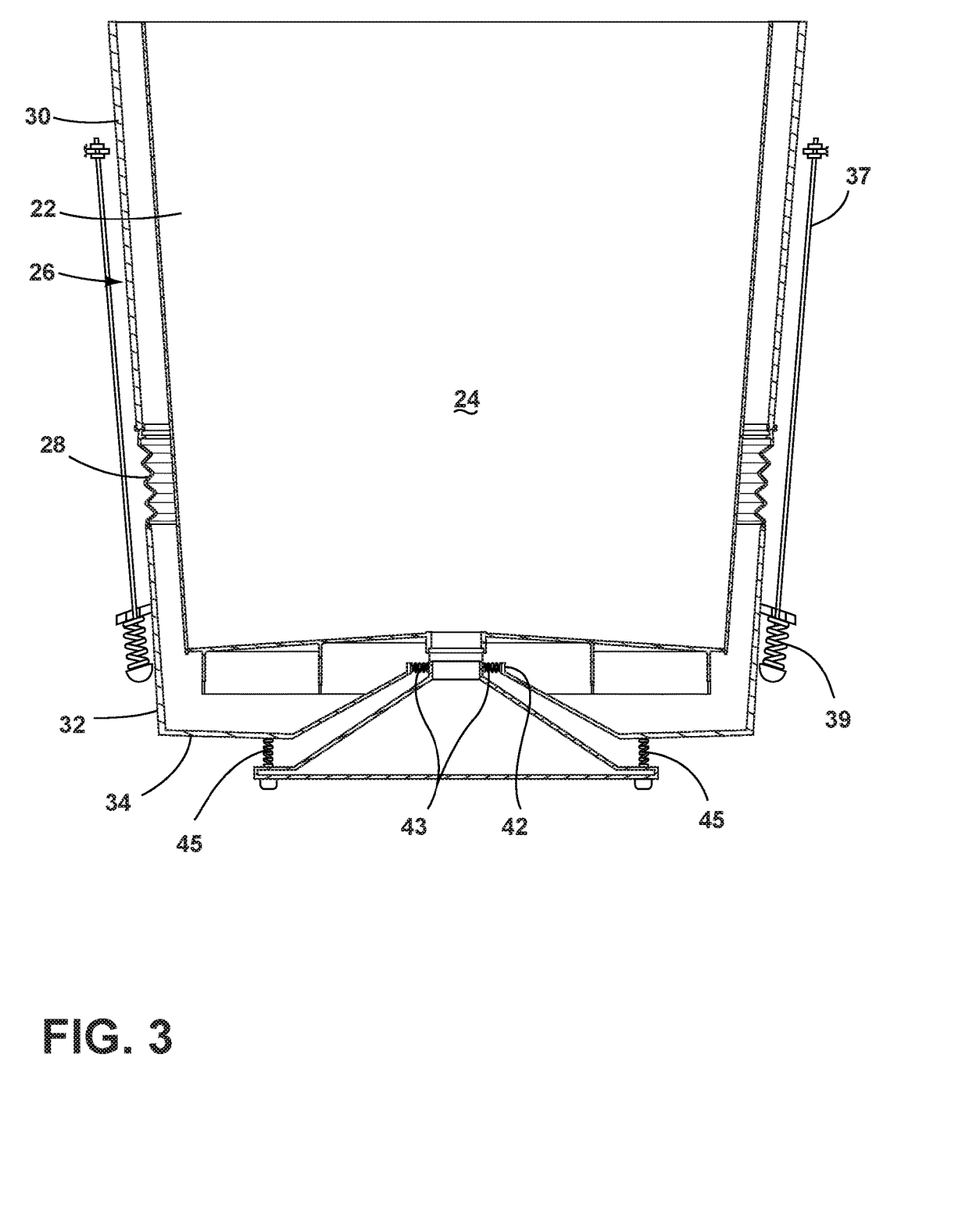
FIG. 3 is a schematic cross-sectional view of a tub that can be utilized in the laundry treating appliance of FIG. 1.

FIG. 3 illustrates exemplary tub 26 structure and tub suspension elements 43, 45 more clearly in an enlarged view. The upper tub portion 30 and the lower tub portion 32 are sealingly connected by the flexible intermediate portion 28. In this way, vibrations introduced to the lower tub portion 32 by action of the wash basket 22 are isolated from the upper tub portion 30 and therefore also from the housing 14. Furthermore, the pluralities of horizontal and vertical suspension elements 43, 45 placed between the driver or drive mechanism and the lower tub portion 32 also serve to partially isolate the lower tub portion 32 from the motion and vibration of the wash basket 22 and the driver or drive mechanism. The horizontal and vertical suspension elements 43, 45 can comprise any suitable damping element. Non-limiting examples of such a damping element include a rubber bushing, a spring, or a damper assembly.

FIG. 3 further illustrates that the tub 26 can be formed from multiple materials. The lower tub portion 32 and the upper tub portion 30 can be formed of plastic, as is known in conventional washing machine tubs, or any other suitable rigid material. The flexible intermediate portion 28 can comprise a bellows and can be formed of any suitable material, especially one that is of a lighter weight and lower stiffness than the lower tub portion 32 and upper tub portion 30. Non-limiting examples of such materials from which the flexible intermediate portion 28 can be formed include rubber, such as EPDM, or Santoprene™. It is also contemplated that the flexible intermediate portion 28 could be formed partially of a flexible material and partially of a more rigid material, in such a way that the more rigid material may comprise a partial frame for the flexible material.

In an exemplary embodiment, the lower tub portion 32, the upper tub portion 30, and the flexible intermediate portion 28 can be co-molded. An exemplary method of making such a wash tub 26 can comprise a first step of molding the lower tub portion 32 and upper tub portion 30. The lower tub portion 32 has a longitudinal axis and an aperture 42 surrounding the longitudinal axis of the lower the tub portion 32. The flexible intermediate portion 28 is then attached to the upper tub portion 30 at a first connection, and to the lower tub portion 32 at a second connection. Both the first and second connections are then sealed. It is also contemplated that the co-molding process can be performed in a two-shot molding implementation wherein the upper and lower tub portions 30, 32 are molded first, out of a rigid plastic material, then the flexible intermediate portion 28, which can be formed from rubber or Santoprene™, is shot into the mold in a second molding step. The second step of molding the flexible intermediate portion 28 can be done either in a second mold, or as an additional section of the initial single mold. In an exemplary embodiment, the two-shot molding process is carried out in a single mold, resulting in a single part co-molded implementation of the wash tub 26. This process results in cost savings due to the necessity for only one mold, as well as manufacturing process improvements in not having to transfer the upper and lower tub portions 30, 32 to a separate mold. Furthermore, the single part two-shot co-molded implementation eliminates the need for a means of mechanical attachment of the flexible intermediate portion 28 to the upper and lower tub portions 30, 32, and creates a molded, watertight seal between each of the sub-sections of the wash tub 26.

Figure 4:
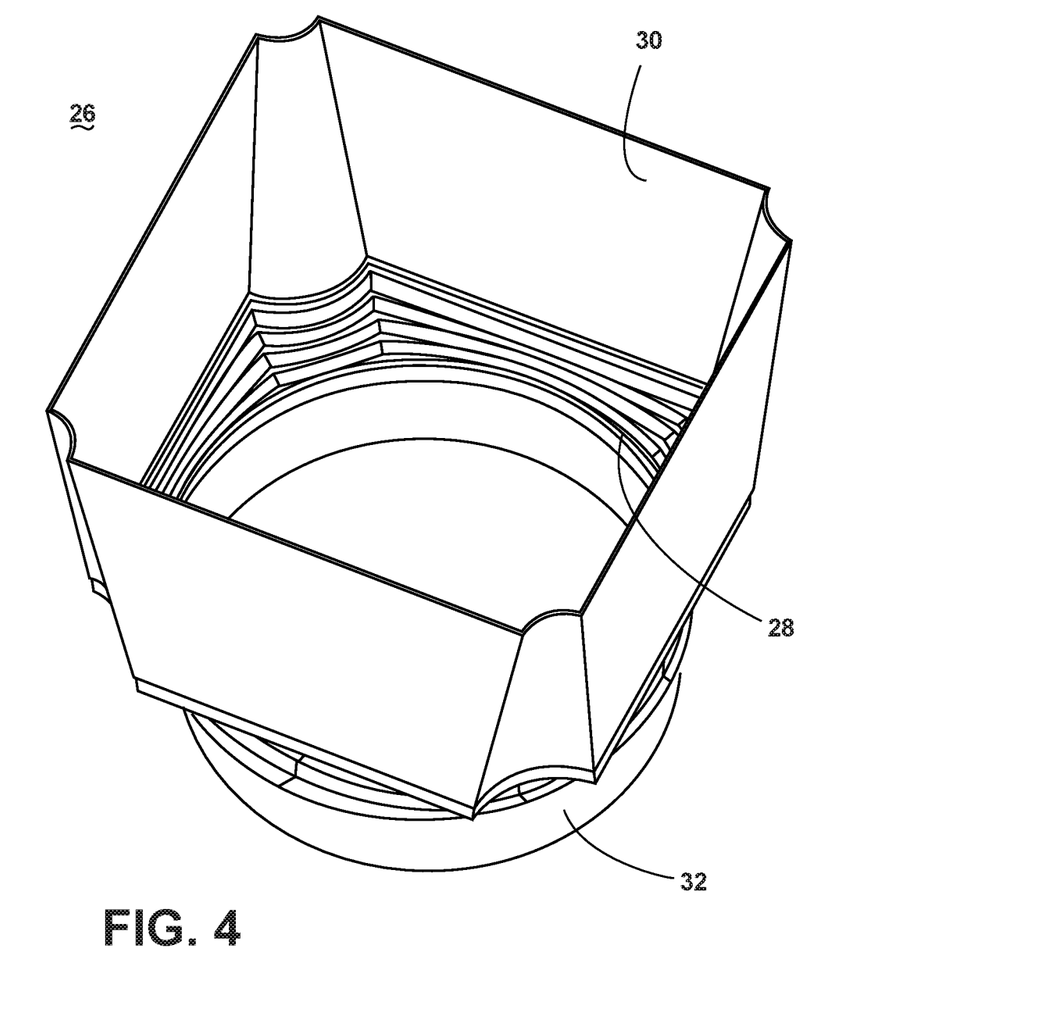
FIG. 4 is a top perspective view of the tub of FIG. 3.

FIG. 4 illustrates a top perspective view of the co-molded wash tub 26 of FIG. 3. The upper tub portion 30 is illustrated as widening in diameter towards the uppermost end of the upper tub portion 30. Furthermore, the upper tub portion 30 includes inwardly rounded portions at the corners that allow for the placement and movement of the suspension rods 37 and damping elements 39 that are attached to the lower tub portion 32. This allows for further structural support, as well as allowance of movement, for the upper tub portion 30 and its movement relative to the housing 14 when the washing machine 10 is in operation.

Figure 5:
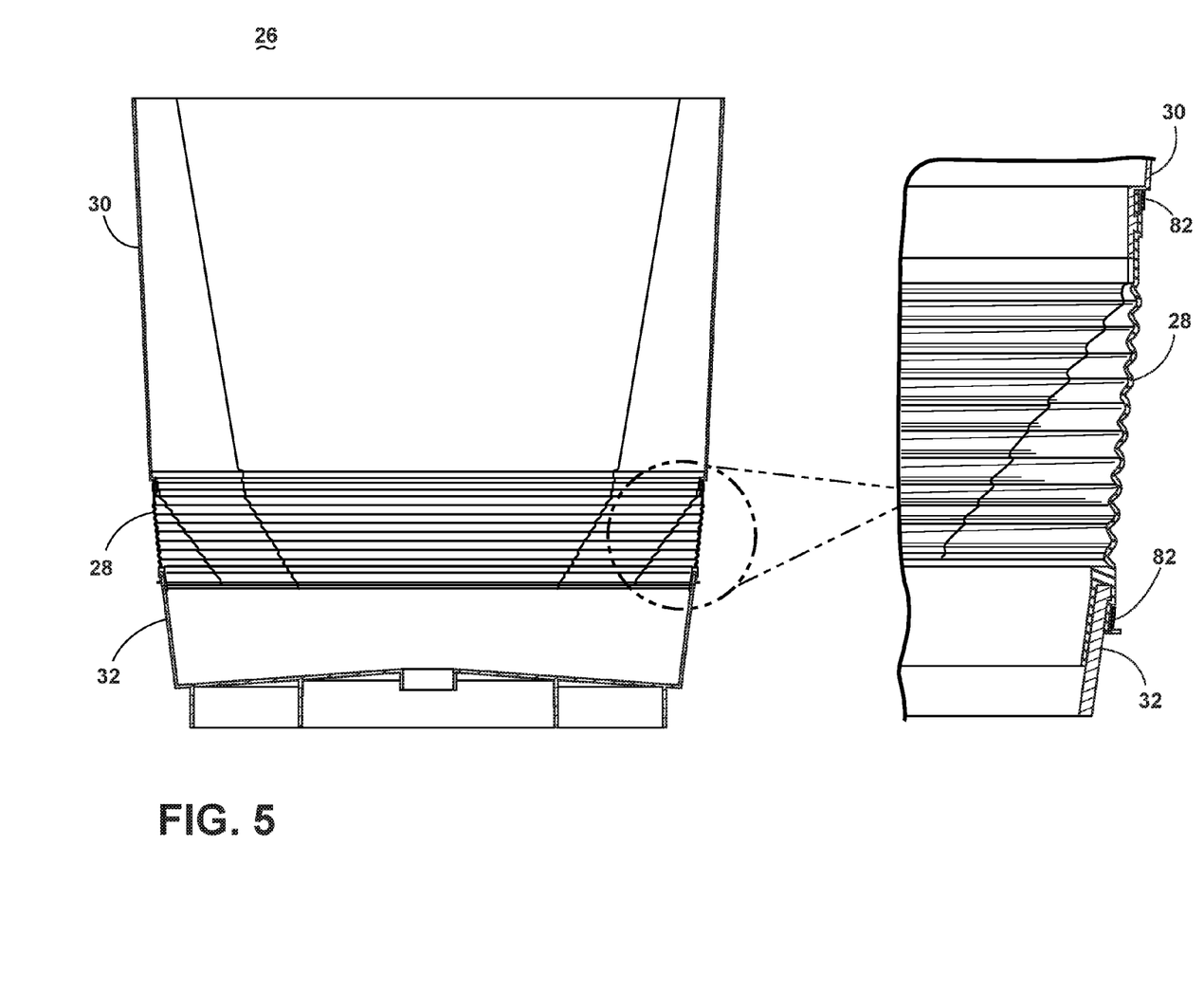
FIG. 5 is a side view of an embodiment of the tub of FIG. 3 showing an enlarged cross-sectional view of the attachment points of the flexible intermediate portion of the tub.
Figure 6:
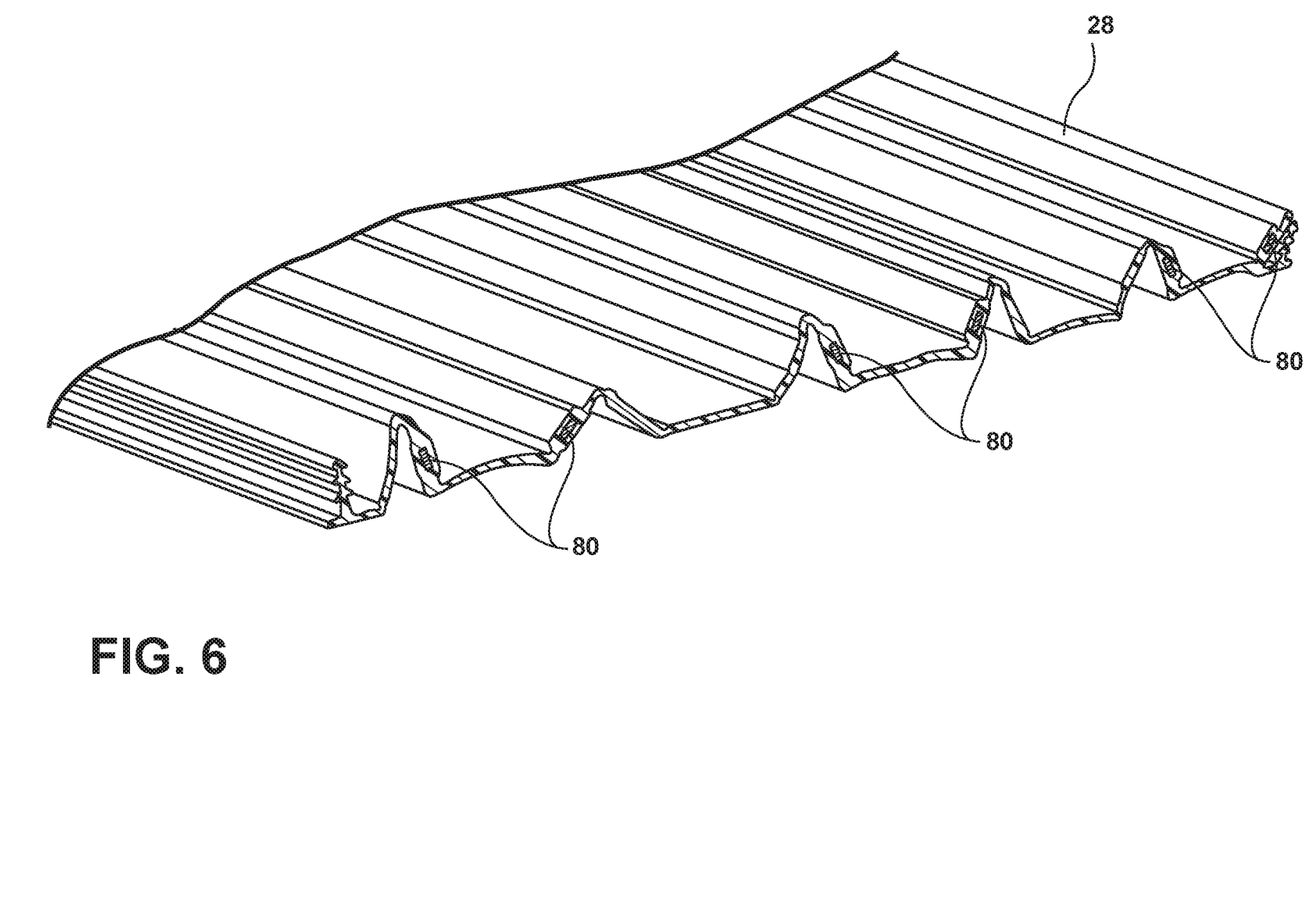
FIG. 6 is an enlarged cross-sectional view of an embodiment of the flexible intermediate portion of the tub of FIG. 5.

FIG. 5 illustrates a front view of the wash tub 26 in an embodiment in which the flexible intermediate portion 28 is not co-molded to the lower tub portion 32 and the upper tub portion 30. In this embodiment, any suitable sealing manner of attachment may be used to join the flexible intermediate portion 28 to the upper and lower tub portions 30, 32. One example of such a method includes the use of steel ties 82 to clamp the flexible intermediate portion 28 about the upper and lower tub portions 30, 32. In an exemplary embodiment, the steel ties 82 provide a circumferential fastening method for maintaining both the upper and lower ends of the flexible intermediate portion 28 in sealing connection with the upper and lower tub portions 30, 32. The steel ties 82 can be a type of zip tie or ratcheting strap that has a self-locking mechanism in order to provide a sturdy seal that can remain tightly fastened over time. The steel ties 82 include upper and lower edges that circumferentially encircles the flexible intermediate portion 28. The upper and lower edges of the steel ties 82 are joined together by perpendicular ribs that provide additional reinforcement. Any suitable self-locking attachment mechanism can be used for the steel ties 82. It is also contemplated that the ties 82 can be composed of any suitable rigid material, rather than steel.

FIG. 5 illustrates an enlarged cross-sectional view of the flexible intermediate portion 28 of the tub 26, where the flexible intermediate portion 28 comprises a bellows. The flexible intermediate portion 28 is provided with a plurality of openings 80 in which steel inserts can be received to increase stiffness and provide reinforcement to the flexible intermediate portion 28. It is also contemplated that the reinforcing inserts could be formed of any other suitable rigid material.

The various aspects described herein provide a variety of benefits including that a tub in which a flexible portion is present can be included in an appliance. Separate suspension elements can be provided between the tub, or at least a lower portion of the tub, and the driving system of the appliance. Such aspects of the present disclosure prevent vibration transmission to the housing of the appliance and can result in reduced noise during operation. Further, aspects of the present disclosure can also allow for a larger capacity tub. Further, the additional suspension elements provided at least partially absorb the movement and vibration from the wash basket and the driver or drive mechanism of the appliance, decreasing wear on other suspension systems within the appliance.

To the extent not already described, the different features and structures of the various embodiments is used in combination with each other as desired. That one feature may not be illustrated in all of the embodiments is not meant to be construed that it may not be, but is done for brevity of description. Thus, the various features of the different embodiments is mixed and matched as desired to form new embodiments, whether or not the new embodiments are expressly described. All combinations or permutations of features described herein are covered by this disclosure.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vertical axis laundry treating appliance, comprising:
a chassis defining a chassis interior;
a tub disposed within the chassis interior and defining a tub interior; and
a wash basket disposed for rotation within the tub interior;
wherein the tub comprises a lower tub portion that is substantially circular in shape at an upper end, an upper tub portion that is substantially quadrilateral in shape at at least one of an upper end and a lower end, and a flexible intermediate portion comprising a bellows and connecting the lower tub portion to the upper tub portion.

2. The laundry treating appliance of claim 1 wherein the upper tub portion widens in diameter towards the upper end of the upper tub portion.

3. The laundry treating appliance of claim 2 wherein the upper tub portion includes an inwardly rounded portion at at least one corner.

4. The laundry treating appliance of claim 1 wherein the upper tub portion includes an inwardly rounded portion at at least one corner.

5. The laundry treating appliance of claim 4 wherein the inwardly rounded portions allow for placement and movement of suspension elements.

6. The vertical axis laundry treating appliance of claim 1 wherein the lower and upper tub portions are formed of plastic.

7. The vertical axis laundry treating appliance of claim 1 wherein the flexible intermediate portion is formed of a lighter material than the lower and upper tub portions.

8. The vertical axis laundry treating appliance of claim 1 wherein the lower and upper tub portions and the flexible intermediate portion are co-molded.

9. The vertical axis laundry treating appliance of claim 1 further comprising a drive mechanism mounted to the lower tub portion for driving rotation of the wash basket.

10. The vertical axis laundry treating appliance of claim 9 further comprising at least one suspension mounting the lower tub portion to the chassis.

11. The vertical axis laundry treating appliance of claim 1 further comprising at least one suspension mounting the lower tub portion to the chassis.

* * * * *